United States Patent
Sanada

[11] Patent Number: 5,972,485
[45] Date of Patent: Oct. 26, 1999

[54] ELECTROCONDUCTIVE COMPOSITION FOR GLASS SUBSTRATE AND ANTI-FOG WINDOW GLASS FOR AUTOMOBILES

[75] Inventor: Tomoki Sanada, Shiga-ken, Japan

[73] Assignee: Murata Manufacturing Co., Ltd., Japan

[21] Appl. No.: 09/177,200

[22] Filed: Oct. 22, 1998

[30] Foreign Application Priority Data

Oct. 28, 1997 [JP] Japan ..................... 9-295762

[51] Int. Cl.$^6$ ...................... B32B 17/00
[52] U.S. Cl. ............ 428/210; 428/325; 428/331; 428/427; 428/428; 428/432; 106/1.13; 106/1.14; 106/13; 252/514
[58] Field of Search .................. 428/210, 325, 428/331, 427, 428, 432; 106/1.13, 1.14, 13; 252/514

[56] References Cited

U.S. PATENT DOCUMENTS 4,057,671  11/1977  Shoop ........................ 428/208
5,213,828   5/1993  Winter ....................... 428/46

*Primary Examiner*—Timothy Speer
*Attorney, Agent, or Firm*—Ostrolenk, Faber, Gerb & Soffen, LLP

[57] ABSTRACT

Disclosed herein is an electroconductive composition for a glass substrate and an anti-fog window glass for automobiles making use of the composition. The electroconductive composition of the present invention can be fired at low temperature, and forms a thick film electrode of excellent moisture resistance and acid resistance. The electroconductive composition is formed of an electroconductive powder, glass frit and an organic vehicle, wherein the glass frit comprises a homogeneous glass component and a silica component; the homogeneous glass component has a composition, with respect to the entirety of the glass frit (100 mol %), of 0–about 30 mol % $B_2O_3$, about 10–30 mol % $SiO_2$ and about 5–35 mol % $Bi_2O_3$, and the silica component is about 35–85 mol % of the entirety of the glass frit (100 mol %).

20 Claims, No Drawings

US 5,972,485

ELECTROCONDUCTIVE COMPOSITION FOR GLASS SUBSTRATE AND ANTI-FOG WINDOW GLASS FOR AUTOMOBILES

BACKGROUND OF THE INVENTION

1. Field of the Invention

The present invention relates to an electroconductive composition for a glass substrate and to an anti-fog window glass for automobiles.

2. Related Art

Hitherto, an electroconductive composition (hereinafter referred to as an electroconductive paste) has been baked on the rear window glass as a measure for preventing fogging of the rear window of an automobile. Hereinafter the thus-baked composition is referred to as a thick film electrode. The thick film electrode has made use of glass frit as an inorganic binder. For glass substrates on which baking is difficult to carry out, such as those of the above-mentioned rear windows, there are used an electroconductive paste which contains a glass frit having a low melting point, so as to permit firing at a low temperature.

However, a low-melting-point glass frit is vulnerable to humidity (moisture) and acid, and therefore has drawbacks in that it causes reduction in adhesion strength when plating is performed after firing. Glass frits that are free from these problems, on the other hand, are silica-rich, high-melting-point glass in nature, which requires a higher firing temperature. Thus, such glass frits are not suitable for substrates which must be fired at a lower temperature, i.e., substrates such as a glass substrate.

SUMMARY OF THE INVENTION

The present inventors have attempted to solve the above-mentioned problems, and have successfully realized an electroconductive composition for glass substrates and an anti-fog window glass for automobiles.

Accordingly, an object of the present invention is to provide an electroconductive composition for glass substrates, which composition can form a thick film electrode, can be fired at a low temperature and is endowed with excellent moisture resistance and acid resistance. Another object of the present invention is to provide an anti-fog window glass for automobiles making use of the composition.

An electroconductive composition for glass substrates according to a first aspect of the present invention is characterized by comprising electroconductive powder, glass frit and an organic vehicle, wherein the glass frit comprises a homogeneous glass component and a silica component; the homogeneous glass component having a composition, with respect to the entirety of the glass frit (100 mol %), of 0 to about 30 mol % $B_2O_3$, about 10–30 mol % $SiO_2$ and about 5–35 mol % $Bi_2O_3$, and the silica component accounting for about 35–85 mol % of the entirety of the glass frit (100 mol %).

An electroconductive composition for glass substrates according to a second aspect of the present invention is characterized by comprising electroconductive powder, glass frit and an organic vehicle, wherein the glass frit comprises a homogeneous glass component and a silica component; the homogeneous glass component having a composition, with respect to the entirety of the glass frit (100 mol %), of about 10–30 mol % $SiO_2$ and about 5–35 mol % $Bi_2O_3$ and optionally up to about 30 mol % $B_2O_3$, and the silica component accounting for about 35–85 mol % of the entirety of the glass frit (100 mol %).

An electroconductive composition for glass substrates according to a third aspect of the present invention is characterized in that the homogeneous glass component has a composition, with respect to the entirety of the glass frit (100 mol %), of 0 to about 11.5 mol % $B_2O_3$, about 78.5–94 mol % $SiO_2$ and about 5.5–19 mol % $Bi_2O_3$.

An electroconductive composition for glass substrates according to a fourth aspect of the present invention is characterized in that the homogeneous glass component has a composition, with respect to the entirety of the glass frit (100 mol %), of about 4.5 mol % $B_2O_3$, about 83.5 mol % $SiO_2$ and about 12 mol % $Bi_2O_3$.

An electroconductive composition for glass substrates according to a fifth aspect of the present invention is characterized in that the silica component accounts for about 55–85 mol % of the entirety of the glass frit (100 mol %).

An electroconductive composition for glass substrates according to a sixth aspect of the present invention is characterized in that the silica component accounts for about 75 mol % of the entirety of the glass frit (100 mol %).

An electroconductive composition for glass substrates according to a seventh aspect of the present invention is characterized in that the silica component has a mean grain diameter of about 20–200 nm. Preferably, the specific surface area is about 150–250 $m^2/g$.

An electroconductive composition for glass substrates according to an eighth aspect of the present invention is characterized in that the electroconductive powder consists of Ag alone, or contains Ag and at least one of Cu, Pd, or Pt, with Ag being a predominant component.

An electroconductive composition for glass substrates according to a ninth aspect of the present invention is characterized in that Ni is added to the electroconductive composition.

An electroconductive composition for glass substrates according to a tenth aspect of the present invention is characterized in that copper oxide is added to the electroconductive composition.

An anti-fog window glass for automobiles according to an eleventh aspect of the present invention comprises a glass substrate and an electroconductive composition which forms a circuit on the glass substrate, wherein the electroconductive composition is any of the above-described electroconductive compositions for glass substrates.

DETAILED DESCRIPTION OF THE PREFERRED EMBODIMENTS

First, of the glass frit samples shown in Table 1, sample Nos. 1 to 15, which contain both a melt component (homogeneous glass component) and a non-melt component (silica component—remainder of the $SiO_2$), were fabricated as described below. Briefly, $H_3BO_3$, $SiO_2$, $Bi_2O_3$, which served as starting materials, were mixed. The mixture was melted at high temperature and then quenched for vitrification. Subsequently, the resultant glass was pulverized. Thereafter, the remainder of the $Sio_2$ was added to and mixed with the obtain glass powder. Sample Nos. 16–30 were fabricated in the same manner as that used for preparing sample Nos. 1–15 using the same component proportions as sample Nos. 1–15, except that the entirety of $SiO_2$ was melted without being divided into two portions.

TABLE 1

| Sample No. | Melt Component (wt %) B$_2$O$_3$ | Melt Component (wt %) Bi$_2$O$_3$ | Melt Component (wt %) SiO$_2$ | Non-melt components (wt %) SiO$_2$ | Total (wt %) | Adhesion strength (N) After Plating | Adhesion strength (N) Before Plating |
|---|---|---|---|---|---|---|---|
| 1 | 30.0 | 5.0 | 15.0 | 50.0 | 65.0 | 15.0 | 20.6 |
| 2 | 11.5 | 5.5 | 20.0 | 63.0 | 83.0 | 18.0 | 20.3 |
| 3 | 0.0 | 6.0 | 9.0 | 85.0 | 94.0 | 20.5 | 21.4 |
| 4 | 20.0 | 10.0 | 30.0 | 40.0 | 70.0 | 16.0 | 20.9 |
| 5 | 12.0 | 12.0 | 12.0 | 64.0 | 76.0 | 17.5 | 20.3 |
| 6 | 4.5 | 12.0 | 8.5 | 75.0 | 83.5 | 18.0 | 22.1 |
| 7 | 2.5 | 19.0 | 23.5 | 55.0 | 78.5 | 16.5 | 20.4 |
| 8 | 12.5 | 23.5 | 29.0 | 35.0 | 64.0 | 16.0 | 19.8 |
| 9 | 4.0 | 25.5 | 25.5 | 45.0 | 70.5 | 17.3 | 19.3 |
| 10 | 2.0 | 33.0 | 30.0 | 35.0 | 65.0 | 15.7 | 18.0 |
| *11 | 32.0 | 15.0 | 13.0 | 40.0 | 53.0 | 5.2 | 21.2 |
| *12 | 23.5 | 22.5 | 24.0 | 30.0 | 54.0 | 8.7 | 23.8 |
| *13 | 5.5 | 34.5 | 15.0 | 45.0 | 60.0 | 9.2 | 20.5 |
| *14 | 18.0 | 32.0 | 15.0 | 35.0 | 50.0 | 4.1 | 19.0 |
| *15 | 1.0 | 1.0 | 5.0 | 93.0 | 98.0 | 8.0 | 9.8 |
| *16 | 30.0 | 5.0 | 65.0 | 0 | 65.0 | 2.5 | 6.2 |
| *17 | 11.5 | 5.5 | 83.0 | 0 | 93.0 | 0.0 | 4.2 |
| *18 | 0.0 | 6.0 | 94.0 | 0 | 94.0 | 3.3 | 4.8 |
| *19 | 20.0 | 10.0 | 70.0 | 0 | 70.0 | 8.6 | 10.8 |
| *20 | 12.0 | 12.0 | 76.0 | 0 | 76.0 | 8.0 | 9.3 |
| *21 | 4.5 | 12.0 | 83.5 | 0 | 83.5 | 4.1 | 5.0 |
| *22 | 2.5 | 19.0 | 78.5 | 0 | 78.5 | 7.2 | 8.4 |
| *23 | 12.5 | 23.5 | 64.0 | 0 | 64.0 | 9.0 | 12.3 |
| *24 | 4.0 | 25.5 | 70.5 | 0 | 70.5 | 8.9 | 9.8 |
| *25 | 2.0 | 33.0 | 65.0 | 0 | 65.0 | 8.5 | 11.0 |
| *26 | 32.0 | 15.0 | 53.0 | 0 | 53.0 | 4.1 | 20.4 |
| *27 | 23.5 | 22.5 | 54.0 | 0 | 54.0 | 8.3 | 20.6 |
| *28 | 5.5 | 34.5 | 60.0 | 0 | 60.0 | 7.8 | 16.5 |
| *29 | 18.0 | 32.0 | 50.0 | 0 | 50.0 | 4.5 | 17.8 |
| *30 | 1.0 | 1.0 | 98.0 | 0 | 98.0 | 3.0 | 4.0 |

Subsequently, an electroconductive paste was prepared for respective glass frit samples. Briefly, Ag powder (75 wt %), glass frit (4 wt %), Ni powder (1 wt %), copper oxide powder (1 wt %) and an organic vehicle (19 wt %) were mixed, and then kneaded and dispersed in an apparatus equipped with three rolls. The organic vehicle was prepared by dissolving a cellulose resin, in an amount of 8 wt %, in terpineol.

The thus-prepared electroconductive paste was applied onto a slide glass substrate (soda-lime glass, 260×760×1.4 mm) by way of printing, to thereby form square prints having sides of 2 mm. The glass substrate was dried for 10 minutes at 150° C. and then fired for 1 minute at 600° C. (In-Out: 5 min) to form a thick film electrode. For rack plating to be performed after formation of the thick film electrode, a connecting electrode was provided for each 2 mm square print.

The surface of each of the thick film electrodes which had undergone firing was placed with Cu or Ni. The conditions for plating were as follows. The distance between the corresponding thick film electrodes was 5 cm for both cases of plating.

Cu plating:
  copper sulfate sol. (1 mol/l)
  plating current 5.0 A/dm$^2$
  plating temperature 40° C.
  plating time 3 min
Ni plating:
  Watts bath
  plating current 1.5 A/dm$^2$
  plating temperature 60° C.
  plating time 5 min The samples which had undergone plating were rinsed with running water, and moisture remaining on the samples was removed with paper. Subsequently, soldering of a terminal was carried out on a 150° C. plate. The terminal was an L-shaped solder-coated copper wire having a diameter of 0.6 mm. The solder employed was Sn-Pb-Ag, and the flux was rosin dissolved in isopropyl alcohol. For some samples, terminals were soldered without precedent plating.

Adhesion strength was measured as follows. The slide glass substrate was fixed so that the terminals faced downward. Each terminal was pulled downward at a speed of 20 mm/min. The strength measured when the electrode was removed represents the adhesion strength. For each paste, testing was repeatedly performed (n=20), based on which an average value was calculated. The results are shown in Table 1.

Each of the glass frit sample Nos. 1–10 and 16–25 are of a composition having a relatively high melting point. Sample Nos. 1–15, in which SiO$_2$ was added in divided portions, were able to be fired at low temperature, and compared with the cases of sample Nos. 16–25 having homogeneous glass compositions, exhibited improved "before plating" adhesion strength. Also, after plating, they showed only a small decrease in adhesion strength.

When the SiO$_2$ content is less than about 65 mol %, the compositions represent low-melting point glass, and exhibit high "before plating" adhesion strength, irrespective of whether or not SiO$_2$ was incorporated in a divided manner. However, they showed low "after plating" adhesion strength. On the other hand, when the SiO$_2$ content is in excess of about 95 mol %, the melting point of the glass is too high, causing insufficient firing of electrodes if low temperature firing is performed, resulting in lowered strength irrespective of whether or not plating was performed.

When the Bi$_2$O$_3$ content is less than about 5 mol %, the melting point of the glass becomes too high for firing to be performed, whereas when the Bi$_2$O$_3$ content is in excess of about 35 mol %, the SiO$_2$ content becomes less than about 65 mol %, resulting in reduction in "after plating" adhesion strength as described above.

Also, in the case in which the B$_2$O$_3$ content is in excess of about 30 mol %, "after plating" adhesion strength becomes low.

Next, the mean grain diameter (nm) of the non-melt component SiO$_2$ in each of sample Nos. 1, 3, 6, and 10 in Table 1 was varied and resistivity ρ ($\mu\Omega\cdot$m) for each case was measured. The results are shown in Table 2.

TABLE 2

| Sample No. | Mean Grain Diameter of Non-melt Component (nm) | Resistivity ($\mu\Omega\cdot$ m) |
|---|---|---|
| 1 | 24 | 3.9 |
| 1 | 95 | 3.8 |
| 1 | 190 | 4.1 |
| 1 | 295 | 6.7 |
| 3 | 24 | 4.2 |
| 3 | 95 | 4.4 |
| 3 | 190 | 5.2 |
| 3 | 295 | 7.8 |
| 6 | 24 | 3.6 |
| 6 | 95 | 4.0 |
| 6 | 190 | 3.9 |
| 6 | 295 | 4.8 |
| 10 | 24 | 3.2 |
| 10 | 95 | 3.0 |

TABLE 2-continued

| Sample No. | Mean Grain Diameter of Non-melt Component (nm) | Resistivity ($\mu\Omega \cdot$ m) |
|---|---|---|
| 10 | 190 | 3.4 |
| 10 | 295 | 5.6 |

The mean grain diameter represents the primary grain diameter as determined through observation under an electron microscope.

The resistivity ρ was determined as follows. A pattern for measuring resistance was fabricated, and resistance was measured. The measured resistance and film thickness were inserted into the following equation: ρ [$\mu\Omega \cdot$m]=film thickness [$\mu$m]×$10^4$×resistance [$\mu$]×W (0.4 mm) /L (200 mm)× $10^6$. The apparatus used for measuring resistance was MULTIMETER (manufactured by HEWLETT PACKARD), and the apparatus for measuring the film thickness was a contact-type film-thickness measuring apparatus, Surfcom (manufactured by TOKYO SEIMITSU). Each sample was measured five times and the measurements were averaged.

As is apparent from Table 2, the greater the mean grain diameter of the non-melt component $SiO_2$, the greater the resistivity.

As described herein above, through use of the electroconductive composition of the present invention for glass substrates, there can be obtained a thick film electrode which, after being fired, is endowed with excellent moisture resistance and acid resistance formed on a substrate which requires low-temperature firing, such as a glass substrate. Also, even when electrodes which have been formed by firing are subjected to plating, high adhesion strength can be obtained. Therefore, the electroconductive composition of the present invention is particularly useful for anti-fog window glass for automobiles.

What is claimed is:

1. An electroconductive composition for glass substrates, comprising electroconductive powder, glass frit and an organic vehicle,
   wherein the glass frit comprises a homogeneous glass component and a silica component;
   the homogeneous glass component having a composition, with respect to the entirety of the glass frit (100 mol %), of 0 to about 30 mol % $B_2O_3$, about 10–30 mol % $SiO_2$ and about 5–35 mol % $Bi_2O_3$; and
   the silica component is about 35–85 mol % of the entirety of the glass frit (100 mol %).

2. An electroconductive composition of claim 1, wherein the homogeneous glass component has a composition, with respect to the entirety of the glass frit (100 mol %), of about 10–30 mol % $SiO_2$ and about 5–35 mol % $Bi_2O_3$.

3. An electroconductive composition for glass substrates according to claim 1, wherein the homogeneous glass component has a composition, with respect to the entirety of the glass frit (100 mol %), of 0 to about 11.5 mol % $B_2O_3$, about 78.5–94 mol % $SiO_2$ and about 5.5–19 mol % $Bi_2O_3$.

4. An electroconductive composition for glass substrates according to claim 1, wherein the homogeneous glass component has a composition, with respect to the entirety of the glass frit (100 mol %), of about 4.5 mol % $B_2O_3$, about 83.5 mol % $SiO_2$ and about 12 mol % $Bi_2O_3$.

5. An electroconductive composition for glass substrates according to claim 1, wherein the silica component is about 55–85 mol % of the entirety of the glass frit (100 mol %).

6. An electroconductive composition for glass substrates according to claim 1, wherein the silica component is about 75 mol % of the entirety of the glass frit (100 mol %).

7. An electroconductive composition for glass substrates according to claim 1, wherein the silica component has a mean grain diameter of about 20–200 nm.

8. An electroconductive composition for glass substrates according to claim 1, wherein the electroconductive powder is Ag alone, or is Ag and at least one of Cu, Pd or Pt, with Ag being a predominant component.

9. An electroconductive composition for glass substrates according to claim 1, wherein the electroconductive composition contains Ni.

10. An electroconductive composition for glass substrates according to claim 1, wherein the electroconductive composition contains copper oxide.

11. An anti-fog window glass for automobiles comprising a glass substrate and an electroconductive composition of claim 1 forming a circuit on the glass substrate.

12. An anti-fog window glass for automobiles comprising a glass substrate and an electroconductive composition of claim 2 forming a circuit on the glass substrate.

13. An anti-fog window glass for automobiles comprising a glass substrate and an electroconductive composition of claim 3 forming a circuit on the glass substrate.

14. An anti-fog window glass for automobiles comprising a glass substrate and an electroconductive composition of claim 4 forming a circuit on the glass substrate.

15. An anti-fog window glass for automobiles comprising a glass substrate and an electroconductive composition of claim 5 forming a circuit on the glass substrate.

16. An anti-fog window glass for automobiles comprising a glass substrate and an electroconductive composition of claim 6 forming a circuit on the glass substrate.

17. An anti-fog window glass for automobiles comprising a glass substrate and an electroconductive composition of claim 7 forming a circuit on the glass substrate.

18. An anti-fog window glass for automobiles comprising a glass substrate and an electroconductive composition of claim 8 forming a circuit on the glass substrate.

19. An anti-fog window glass for automobiles comprising a glass substrate and an electroconductive composition of claim 9 forming a circuit on the glass substrate.

20. An anti-fog window glass for automobiles comprising a glass substrate and an electroconductive composition of claim 10 forming a circuit on the glass substrate.

* * * * *